United States Patent [19]

Loessel

[11] Patent Number: 4,467,184

[45] Date of Patent: Aug. 21, 1984

[54] THERMAL RANGE CONTROL

[75] Inventor: Mark C. Loessel, Mishawaka, Ind.

[73] Assignee: Whirlpool Corporation, Benton Harbor, Mich.

[21] Appl. No.: 423,738

[22] Filed: Sep. 27, 1982

[51] Int. Cl.³ ............................................... H05B 1/02
[52] U.S. Cl. ..................................... 219/506; 219/492;
219/509; 340/583; 99/332; 99/344
[58] Field of Search ................ 219/10.55 B, 492, 493,
219/507, 483, 506, 494, 508, 509, 491, 510;
99/327, 332, 342, 344; 340/583, 527

[56] References Cited

U.S. PATENT DOCUMENTS

| 4,162,381 | 7/1979 | Buck | 219/10.55 B |
| 4,222,037 | 9/1980 | Schaap et al. | 340/309.4 |
| 4,345,145 | 8/1982 | Norwood | 219/506 |
| 4,393,300 | 7/1983 | Proctor | 219/506 |

FOREIGN PATENT DOCUMENTS 2556412  6/1977  Fed. Rep. of Germany ...... 219/506

Primary Examiner—M. H. Paschall
Attorney, Agent, or Firm—Wood, Dalton, Phillips, Mason & Rowe

[57] ABSTRACT

A control for a thermal oven having a manually settable timer for establishing preselected broiling and baking times. The control includes an alarm and circuitry for sounding the alarm at the end of the timed cooking period. The control further de-energizes the heating elements a short preselected time after the time period set by the user in the event the user does not take affirmative steps in response to the alarm. The control continues to provide a reminder alarm operation at predetermined intervals, such as five-minute intervals, until such time as the user provides the affirmative input to terminate the control operation and reset the system.

10 Claims, 3 Drawing Figures

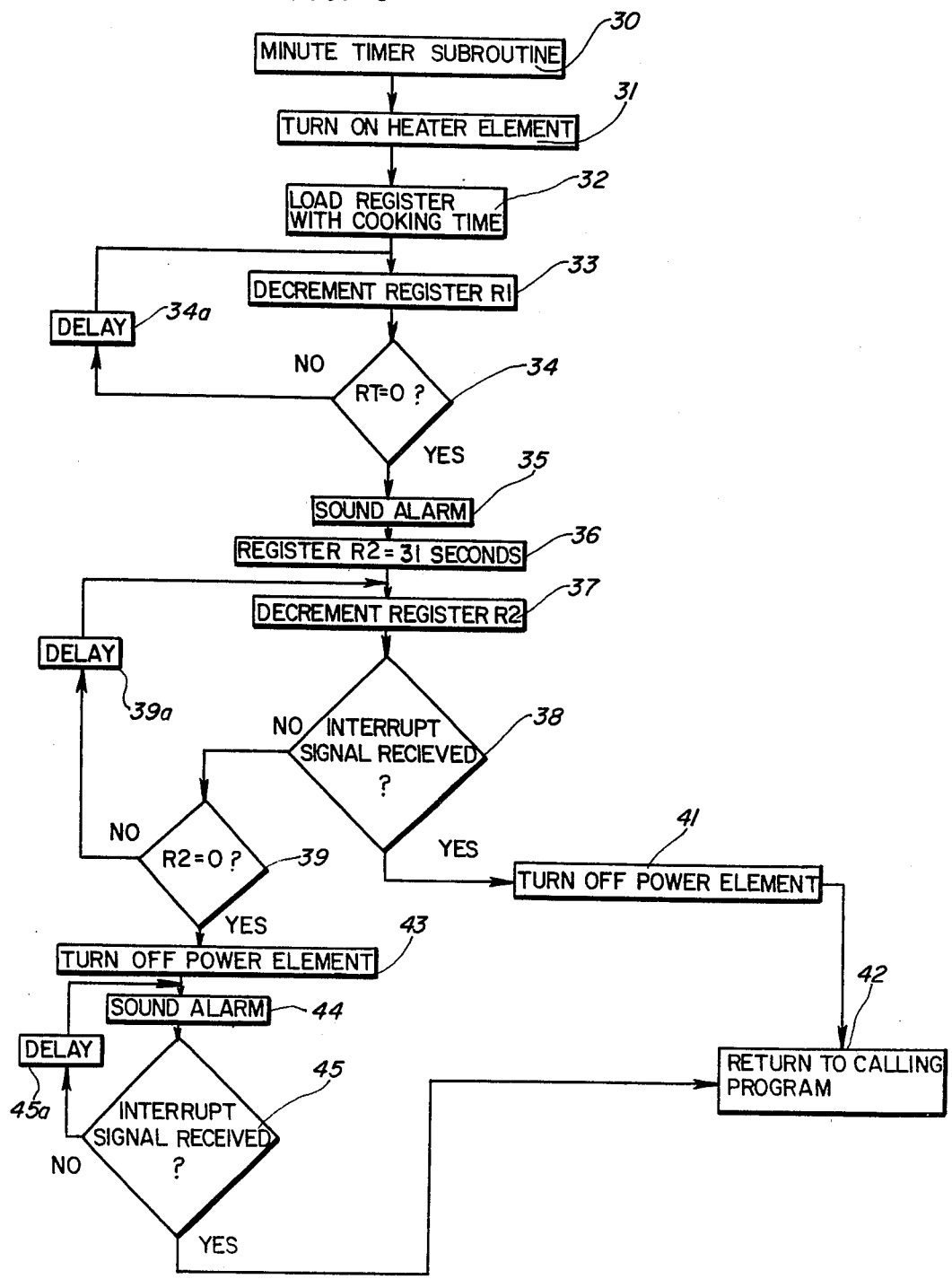

THERMAL RANGE CONTROL

BACKGROUND OF THE INVENTION

1. Field of the Invention

This invention relates to cooking ranges and in particular to control means for use therein.

2. Description of the Prior Art

In U.S. Pat. No. 3,974,472, Robert R. Gould, Jr. discloses a domestic appliance control and display panel having a touch control and digital control logic for energizing power circuits controlling various range heater elements in response to a program entered by the user.

In U.S. Pat. No. 3,855,574 of Robert E. Welty, an alarm system is disclosed for use in devices, such as cooking timers, including a voice-operated switch which turns off the alarm when a voice command is received. The alarm repeats itself after a predetermined interval unless a manual switch is actuated which will disable the circuit and the alarm. The alarm continues to sound until the voice command is received.

In U.S. Pat. No. 3,286,924 of Jeno D. Banathy, a timer adjusted oven thermostat is provided which is reduced to a holding temperature at the end of a preset stop time. The holding temperature, for example, is 140° F. The holding temperature is maintained for a predetermined period such as two hours, at the termination of which the thermostat is restored to the "off" position and the timer is returned to the manual position for subsequent manual or automatic control as desired.

SUMMARY OF THE INVENTION

The present invention comprehends an improved apparatus for preventing overcooking of food by a thermal range which is extremely simple and economical of construction.

More specifically, the invention comprehends the provision in a thermal range having a heating element, manually operable control means for causing selective energization of the heating element, timing means for timing a preselected cooking period, and alarm means for providing an alarm at the end of the preselected cooking period, an improved apparatus for preventing overcooking food by the range including a de-energizing means for causing de-energization of the heating element a preselected delay time after the provision of the alarm in the event the control means is not manually operated to discontinue energization of the heating element within the preselected delay time, and reminder means for providing a reminder alarm indicating the operation of the de-energizing means to de-energize the heating element until manual operation of the control means to a de-energizing condition is effected.

In the illustrated embodiment, the reminder means provides an intermittent alarm such as at intervals of approximately five minutes.

The range may include an access door and the control means includes means for causing discontinuation of energization of the heating element as an incident of opening the access door during the delay period.

In the illustrated embodiment, the range includes a lamp and the control means includes means for causing discontinuation of energization of the heating element as an incident of energizing the lamp during the delay period.

In the illustrated embodiment, the control means includes an input keyboard means and means for causing discontinuation of energization of the heating element as an incident of actuation of the keyboard means during said delay time.

In the illustrated embodiment, the delay period is approximately 30 seconds.

The improved overcooking-prevention apparatus is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 3 is a flow chart illustrating the control process of the overcooking-prevention means.

DESCRIPTION OF THE PREFERRED EMBODIMENT

Figures 1, 2:
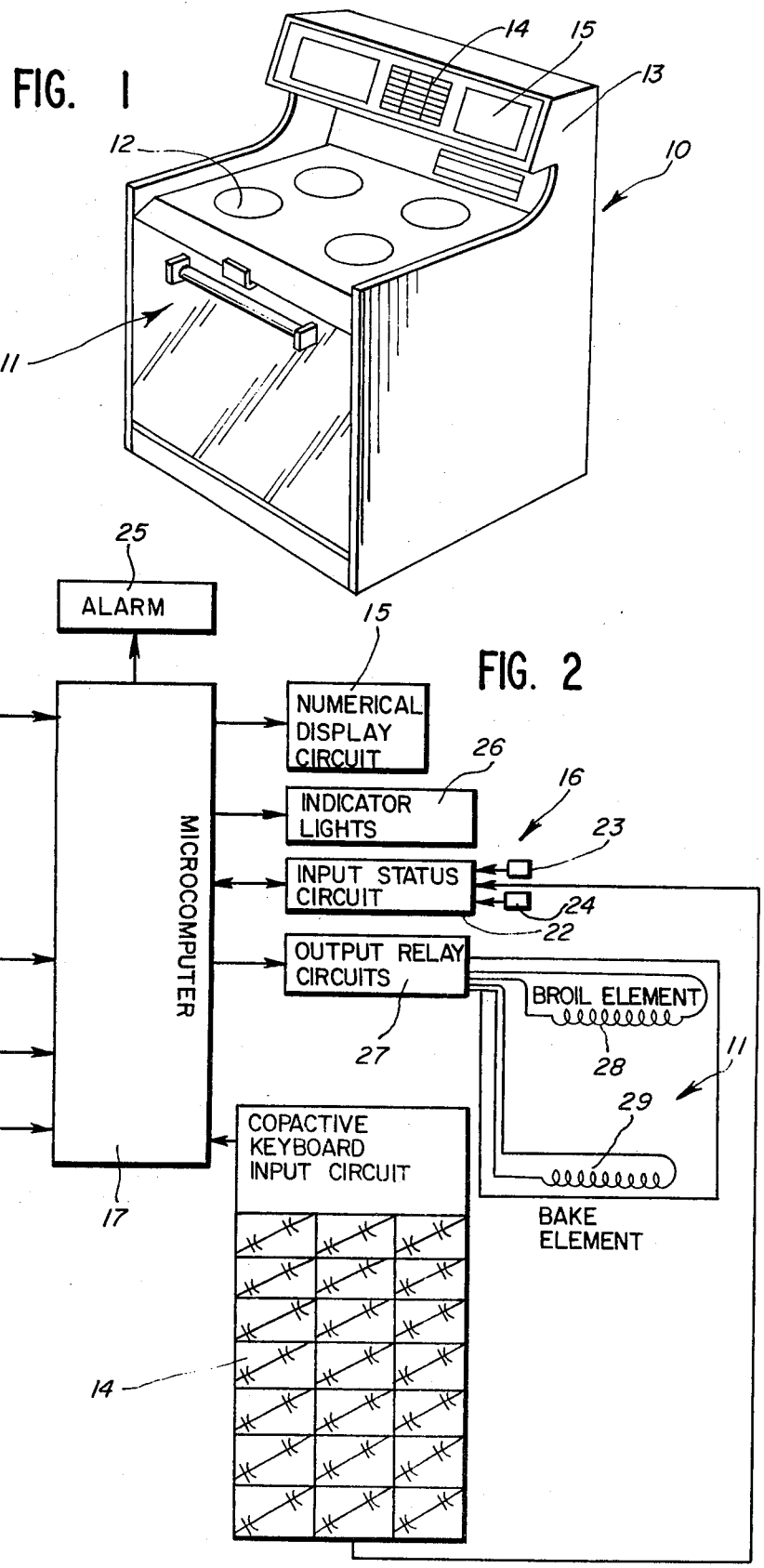
FIG. 1 is a perspective view of a thermal range having means for preventing overcooking of food therein embodying the invention.
FIG. 2 is a schematic block diagram illustrating the components of the overcooking-prevention means.

In the exemplary embodiment of the invention as disclosed in the drawing, a cooking apparatus generally designated 10 is shown to comprise a thermal range including an oven portion 11 having a door 8 for closing the oven and a handle for opening the oven door 8, and a cooktop portion 12. A console portion 13 is provided at the upper rear of the range and includes a keyboard 14 and a digital readout display 15.

The console 13 further houses a control generally designated 16 which, as illustrated in FIG. 2, includes a microcomputer 17. The microcomputer receives an input from the keyboard 14 which comprises a capacitive keyboard.

Circuit 16 further includes a conventional power supply 18, a reset circuit 19 for resetting the microcomputer when powering up the power supply, a clock oscillator circuit 20 for providing clock pulses to the microcomputer 17, a temperature sensor circuit 21 for sensing the temperature within the oven 11, and an input status circuit 22 responsive to a door switch 23, an oven cavity light switch 24, or a suitable entry in keyboard 14. The microcomputer controls an alarm 25 which, in the illustrated embodiment, comprises an audible alarm, such as a buzzer. The microcomputer further controls the numerical display 15 and appropriate indicator lights 26.

The microcomputer controls an output relay circuit 27 which, in turn, controls the energization of a Broil Element 28 and a Bake Element 29 for heating the oven 11.

Microcomputer 17 is suitably programmed to permit the user of the range to establish a desired broiling or baking time by suitable manipulation of the keyboard 14. The control then provides an indication of the end of the preset broiling or baking period by sounding the alarm 25. In the event the user does not hear the alarm at that time, the broiling or baking operation is allowed to continue only for a short delay period of time. In the event that no input to the microcomputer is made from the keyboard by the user, or through the input status circuit through the door switch 23 or oven light switch 24 by actuation thereof by the user, by the end of the delay period, the control causes the output relay circuit 27 to de-energize the Broil Element or Bake Element. In the illustrated embodiment, the delay period is 30 seconds and, thus, if no input from the user is received by the microcomputer, the broiling or baking operation is terminated within 30 seconds of the preset broiling or baking time inputted into the keyboard 14 by the user.

The invention comprehends that an indication be provided to the user of the failure to provide an input to the control and that the control has terminated the broiling or baking operation automatically, requiring the user make an appropriate input to the keyboard 14 to reset the control. Thus, while some additional heat transfer is effected to the material being broiled or baked in view of the relatively large oven thermal time constant, de-energizing of the heating elements of the oven effectively minimizes overcooking and over-browning of the material.

In the illustrated embodiment, the microcomputer is programmed to repetitively actuate alarm 25 at preselected intervals following the initial delay period at the end of which the heating elements were de-energized. Illustratively, the control 17 causes the repetitive energization of alarm 25 at five minute intervals until such time as the user terminates the operation by either opening the oven door, illuminating the oven cavity lamp, or suitably actuating the keyboard 14.

Referring to FIG. 3, a flow chart indicating the subroutine within the microcomputer effecting the desired control of the oven elements 28 and 29, as discussed above, is illustrated. Thus, as shown, the minute timer subroutine is called by a main program and is initiated at block 30. Initiation thereof continues the program to block 31 wherein the appropriate heater element 28 or 29 is energized.

The program continues to block 32 wherein a microcomputer register R1 is loaded with the preselected time inputted to the microcomputer by the user's manipulation of keyboard 14.

The program continues to block 33 wherein the microcomputer register R1 is decremented a given amount.

The program continues to decisional block 34 wherein a determination is made whether or not register R1 equals zero. If the answer is no, the program returns through a delay block 34a to block 33 for further decrementing of register R1.

When the decrement register R1 has timed out, indicating that the preselected time set by the user by actuation of keyboard 14 has been reached, the register R1 equals zero and the program continues from decisional block 34 to block 35 wherein the alarm 25 is energized for a given period of time.

The program then continues to block 36 wherein a second register R2 is set for 31 seconds and the program then continues to block 37 wherein register R2 is decremented toward zero.

The program continues from block 37 to decisional block 38 which determines whether an interrupt signal has been received from the keyboard 14, or input status circuit 22. If the answer is no, the program continues to decisional block 39 which then determines whether register R2 equals zero. If this answer is no, the program continues through a delay block 39a of approximately one second back to block 37 for further decrementing of register R2.

If the answer at decisional block 38 is yes, an interrupt signal has been received by the microcomputer, the program then continues to block 41 wherein the microcomputer de-energizes the energized heating coil 28 or 29 and returns the microcomputer to block 42 for return thereof to the main or calling program.

If the answer at decision block 39 is yes, the decremental register R2 has decreased to zero, the program continues to block 43 wherein the microcomputer turns off the energized heating unit 28 or 29. Under this condition, however, the user has not entered an appropriate command to the microcomputer and the program then continues to block 44 wherein the alarm 25 is energized for a given period of time. The program then continues to decisional block 45 wherein determination is made again as to whether an interrupt signal has been received. If the answer is no, the program returns through a delay block 45a to block 44 so as to sound the alarm at intervals determined by the delay block 45a which, illustratively, may be five minutes. Thus, the alarm 25 is repetitively sounded at preselected intervals until such time as the user returns and terminates the subroutine by providing an interrupt signal through the keyboard 14, switch 23, or switch 24. Upon the provision of such an interrupt signal, causing the answer at decisional block 45 to be yes, the program continues to the block 42 returning the control to the calling program.

Thus, in summary, the control program causes an automatic sounding of the alarm 25 approximately 30 seconds after the preset cooking period has been timed out in the event the user does not provide an interrupt signal to the control during that period. The control then continues to provide an alarm at longer preselected intervals, such as at five minute intervals, until such time as the user provides an interrupt signal to the control. The control automatically turns the heating units off at the end of the initial 30-second delay so as to avoid substantial overbroiling or overbaking of the food material in the oven.

Thus, the control automatically advises the user that affirmative steps must be taken to terminate the programmed operation. Thus, the user is reminded repetitively that the broiling or baking operation has been terminated and that the food material is still in the oven. The control continues to remind the user of this until such time as the user affirmatively inputs to the control.

By providing the repetitive reminder or nagger alarm in combination with the automatic termination of the heater energization, an improved control of the cooking operation is provided effectively avoiding burning or overbrowning of the food material in the oven.

The foregoing disclosure of a specific embodiment is illustrative of the broad inventive concepts comprehended by the invention.

I claim:

1. In a thermal range having a heating element, manually operable control means for causing selective energization of the heating element during a cooking period, timing means for timing a preselected cooking period, and alarm means for providing an alarm at the end of said preselected cooking period, improved apparatus for preventing overcooking of food by said range, said apparatus comprising:

de-energizing means for causing de-energization of the heating element a preselected delay time after the provision of the alarm in the event said control means is not manually operated to discontinue energization of the heating element within said preselected delay time, said delay time being of a short duration preselected to avoid undesirable further cooking of the food; and reminder means for providing a reminder alarm indicating the operation of said de-energizing means to de-energize the heating element until manual operation of the control means to a de-energizing condition is effected.

2. The overcooking-prevention apparatus of claim 1 wherein said reminder means comprises means for providing an intermittent alarm.

3. The overcooking-prevention apparatus of claim 1 wherein said reminder means comprises means for providing an intermittent alarm at preselected intervals.

4. The overcooking-prevention apparatus of claim 1 wherein said range includes an access door and said control means includes means for causing discontinuation of energization of the heating element as an incident of opening the access door during said delay time.

5. The overcooking-prevention apparatus of claim 1 wherein said range includes a lamp and said control means includes means for causing discontinuation of energization of the heating element as an incident of energizing said lamp during said delay time.

6. The overcooking-prevention apparatus of claim 1 wherein said control means includes keyboard means and means for causing discontinuation of energization of the heating element as an incident of actuation of the keyboard means during said delay time.

7. The overcooking-prevention apparatus of claim 1 wherein said alarm means comprises an auditory alarm means.

8. The overcooking-prevention apparatus of claim 1 wherein said control means includes indicating light means.

9. The overcooking-prevention apparatus of claim 1 wherein said delay time is approximately 30 seconds.

10. The overcooking-prevention apparatus of claim 1 wherein said reminder means comprises means for repetitively providing an alarm at intervals of at least approximately five minutes.

* * * * *